UNITED STATES PATENT OFFICE.

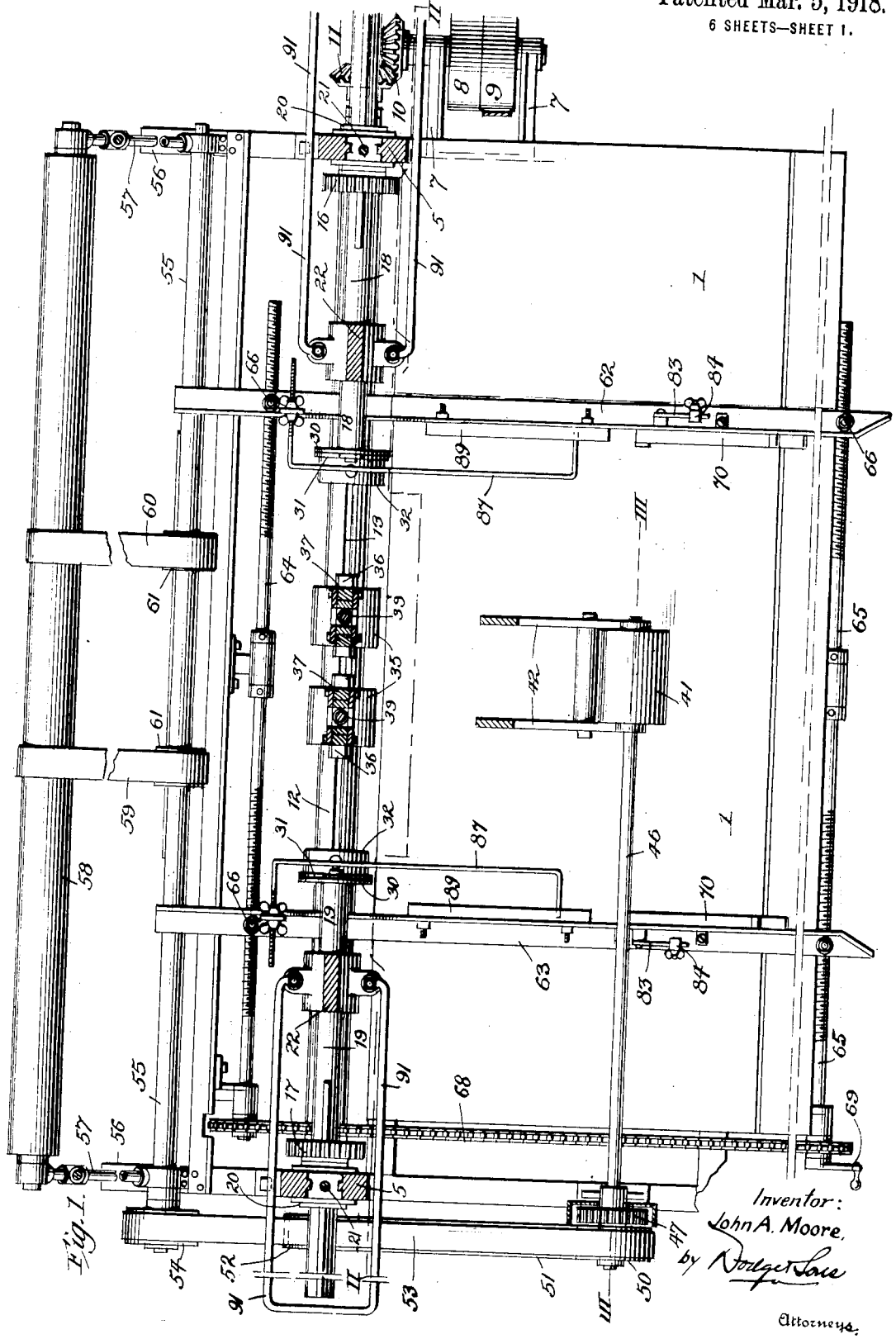

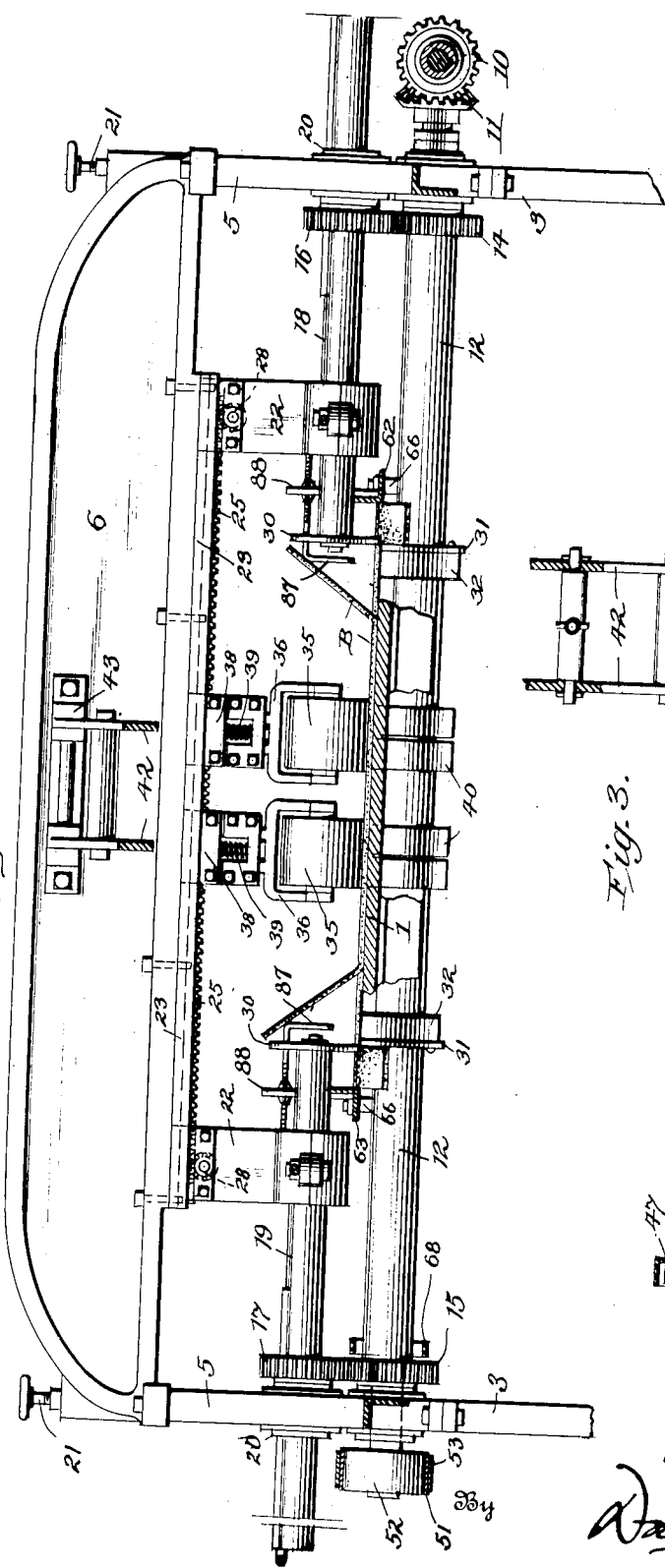

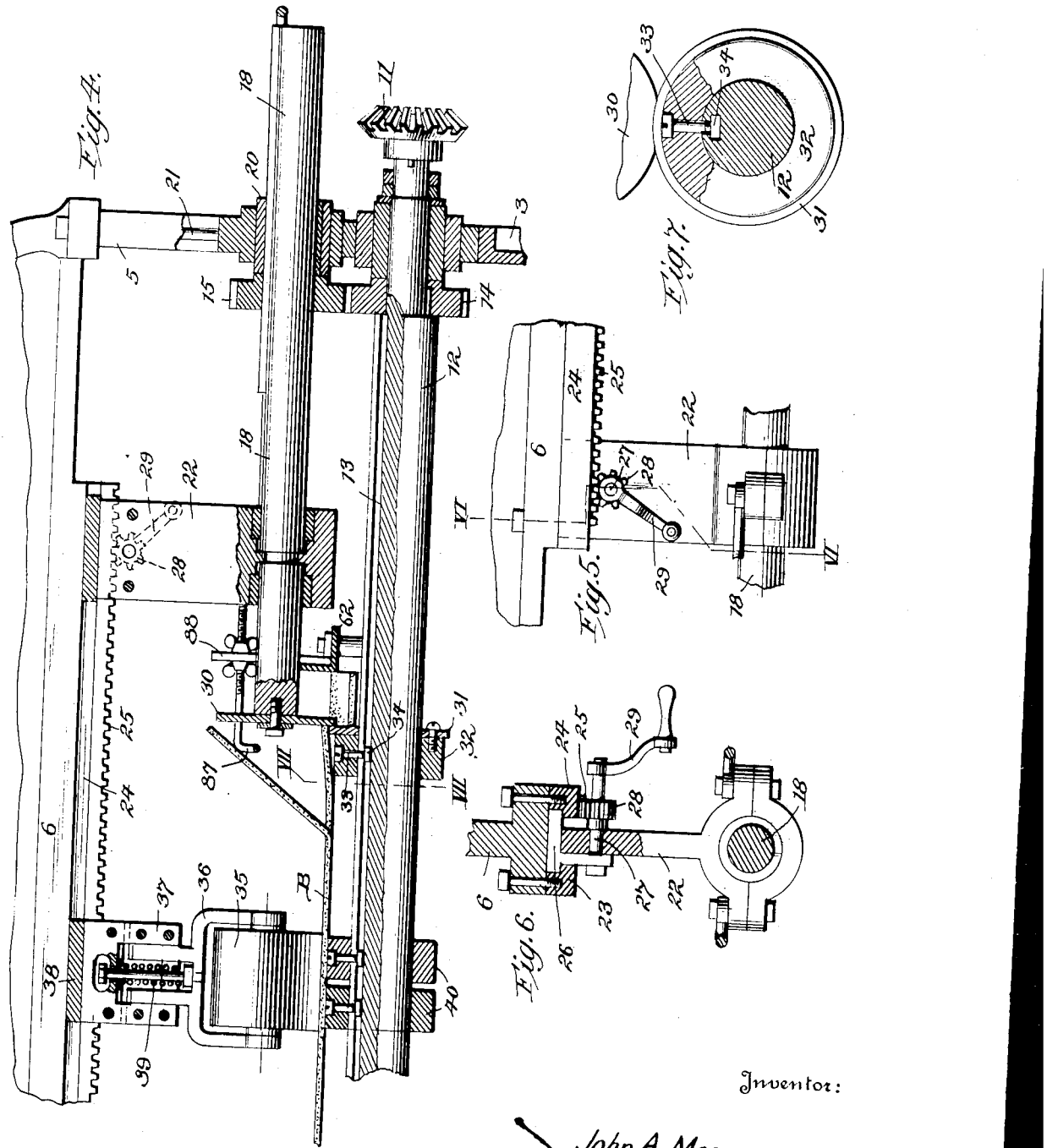

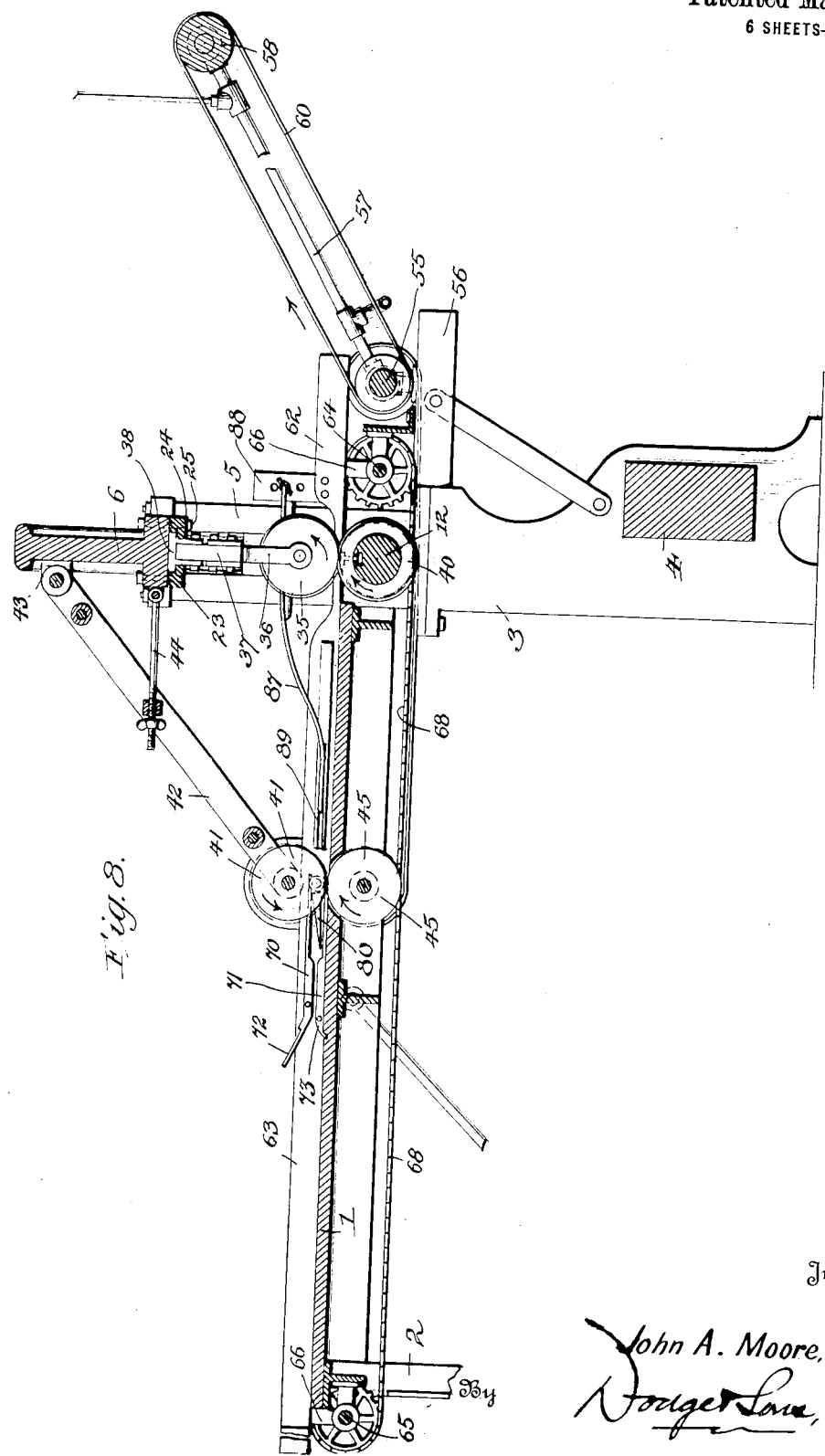

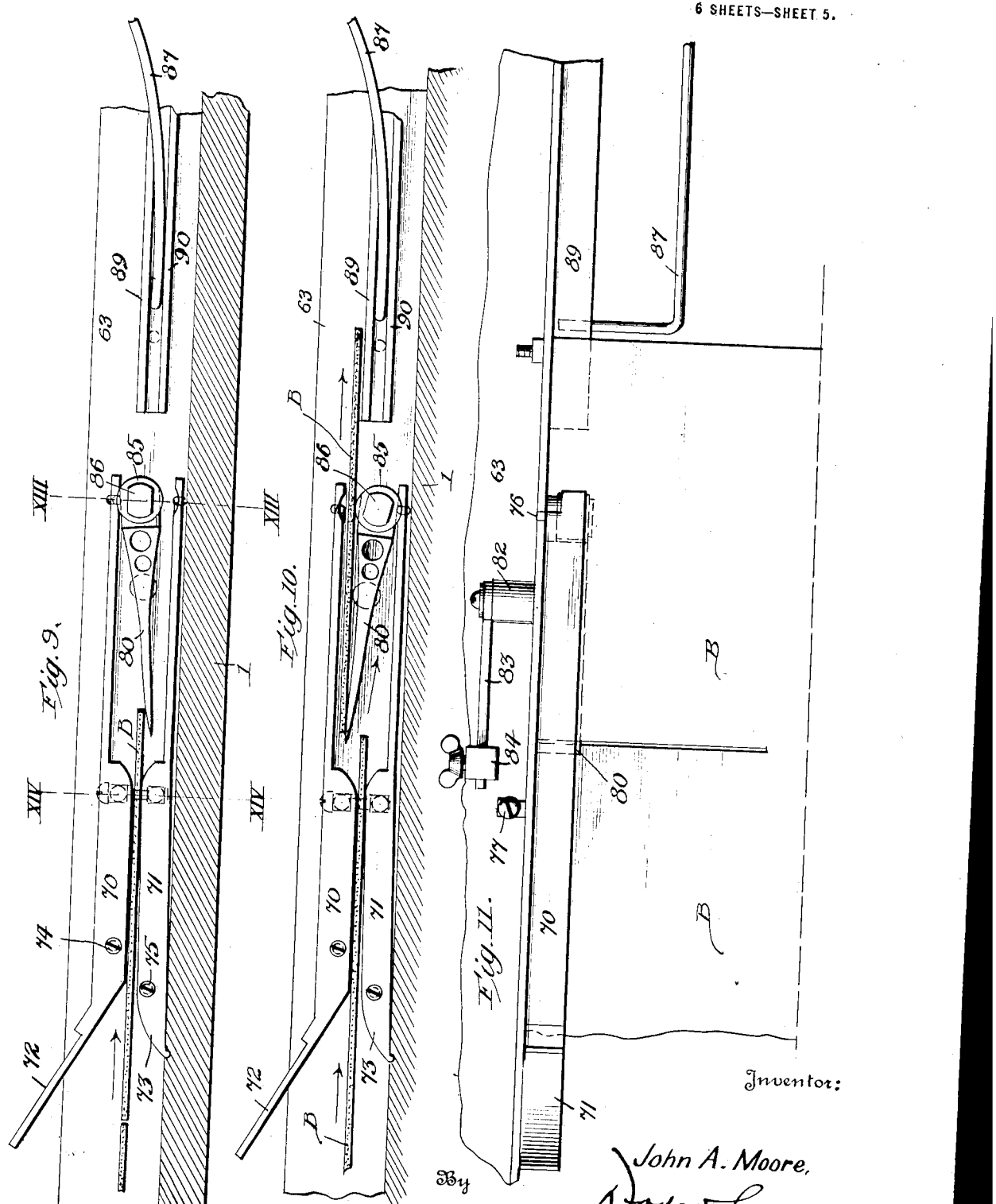

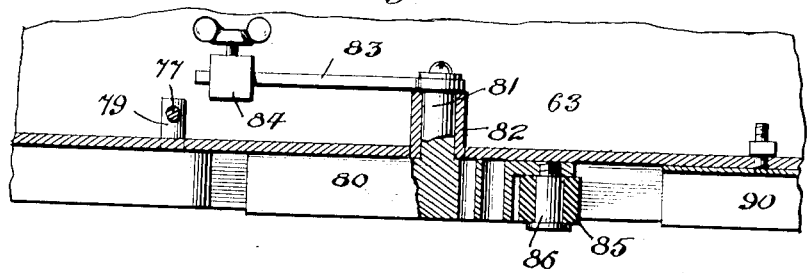
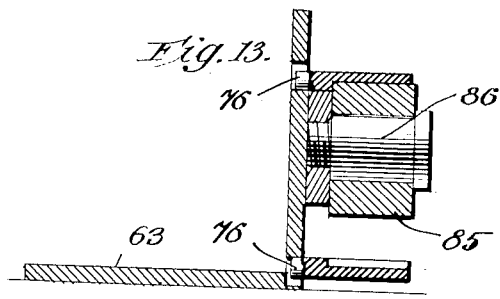
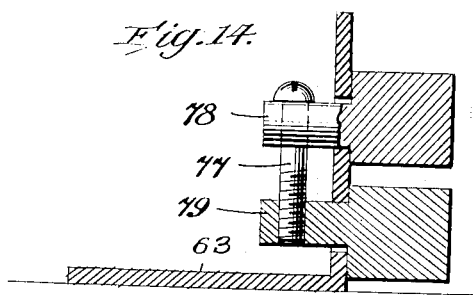
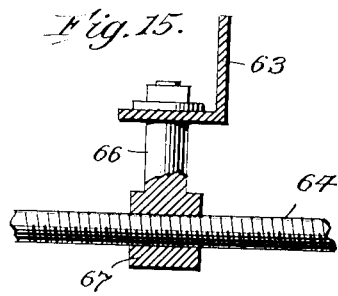

JOHN A. MOORE, OF LOUISVILLE, KENTUCKY, ASSIGNOR TO MENGEL BOX COMPANY, OF LOUISVILLE, KENTUCKY, A CORPORATION OF NEW JERSEY.

MACHINE FOR CUTTING OR TRIMMING BOX-BLANKS.

1,258,599.     Specification of Letters Patent.     Patented Mar. 5, 1918.

Application filed September 10, 1917. Serial No. 190,568.

*To all whom it may concern:*

Be it known that I, JOHN A. MOORE, a citizen of the United States, residing at Louisville, in the county of Jefferson and State of Kentucky, have invented a certain new and useful Improvement in Machines for Cutting or Trimming Box-Blanks, of which the following is a specification.

My present invention pertains to an improved machine for cutting blanks for boxes, cartons, or the like, and more particularly for cutting the blanks in such manner that when they are folded up the oppositely-disposed inturned portions will abut each other so that the box will be stiffened laterally thereby.

The invention is illustrated in the annexed drawings, wherein:

Figure 1 is a top plan view of the machine, partly in section;

Fig. 2 is a transverse, vertical sectional view, taken on the line II—II of Fig. 1;

Fig. 3 is a detail vertical sectional view taken on the line III—III of Fig. 1, and showing the means employed for driving the initial feed rolls;

Fig. 4 is a detail vertical sectional view showing the cutting mechanism, the secondary feed rolls, and the turn-up device for the box flaps;

Fig. 5 is a rear elevation of the hanger in which one of the cutter-shafts is mounted, showing the means for adjusting said hanger and consequently the cutter;

Fig. 6 is a sectional elevation taken on the line VI—VI of Fig. 5;

Fig. 7 is a detail sectional view taken on the line VII—VII of Fig. 4, illustrating more particularly the manner of securing the lowermost cutter to its shaft;

Fig. 8 is a longitudinal vertical section taken through the central portion of the machine;

Fig. 9 is a side elevation showing one of the switches employed for diverting certain of the box flaps away from the cutter;

Fig. 10 is a similar view showing one of such flaps in its diverted position, and the switch thrown upwardly so as to divert the next succeeding flap downwardly;

Fig. 11 is a top plan view of one of the switch devices and the guide elements which coöperate therewith;

Fig. 12 is a longitudinal horizontal sectional view of one of the switch devices;

Fig. 13 is a transverse vertical sectional view taken on the line XIII—XIII of Fig. 9;

Fig. 14 is a similar view taken on the line XIV—XIV of Fig. 9;

Fig. 15 is a detail view showing one of the blank guides and the manner in which it is supported and adjusted.

The machine is designed to handle blanks which have been previously notched along the edge, and to cut off a portion of each alternate flap upon each side of the blank. It is capable of handling stock formed of fiber board, corrugated board, or any similar box material, and is readily adjustable so that it may accommodate blanks of different sizes. While the machine is shown with a plurality of cutters designed to operate upon the oppositely-disposed flaps at the opposite sides of the blank, it is conceivable that it may operate upon one side only, though of course the dual arrangement is of marked advantage.

In the drawings, 1 denotes a table supported at its forward or feed end by legs 2 and at its opposite end by standards 3 secured firmly to each other by a cross bar 4. The standards 3 are provided with upward extensions 5 which rise above the table 1 and are connected by a cross beam 6, which beam as will presently appear, forms the support for the hangers in which are mounted the cutter shafts, the secondary guide rolls, and the hanger for one of the initial guide rolls. To one side of the table as best indicated in Fig. 1, there are secured brackets 7, which form the support for a short shaft carrying fast and loose pulleys 8 and 9, the shaft also having secured to it a bevel gear 10 which meshes with a similar gear 11 secured upon the outer end of a shaft 12 mounted in bearings secured in the standards 3. This shaft extends across the structure from one side to the other, and is in effect the main driving shaft of the machine.

The shaft 12 as will be most clearly seen upon reference to Figs. 4 and 7, is provided with an undercut groove 13 which extends the full length thereof, and which forms a portion of the means whereby one of the elements of the secondary feed mechanism and the rotary cutter may be secured in place thereon. Said shaft 12 has splined to it adjacent each end gears 14 and 15, which mesh with similar gears 16 and 17 splined respectively upon the overlying shafts 18 and 19. These shafts 18 and 19 carry the uppermost cutters, and inasmuch as the cutters are duplicated on each side of the machine, the description of one side only will be given, it being understood that the others are identical and are similarly lettered. Shaft 18 extends through a bearing 20 which is mounted in the upward extension 5, and held in position by adjusting screws 21. (See Figs. 2 and 4). The inner end of the shaft 18 finds a bearing in the lower end of a hanger 22, the bearing being so formed as will be seen upon reference to Fig. 4, that the shaft will move endwise under adjustment of said hanger.

Secured to the under face of the cross beam 6 (see more particularly Fig. 6), is an L-shaped rail 23, and likewise a second rail 24 having a rack 25 formed upon the under face thereof. The T-shaped head 26 secured to the hanger 22 is designed to be engaged by the rails 23 and 24, and to be supported thereby. The hanger 22 is provided with an opening adapted to receive the end of a shaft 27 carrying a pinion 28, which when the shaft is positioned by hand, will mesh with the rack 25. A crank 29 secured to the shaft 27 admits of adjustment of the hanger 22 lengthwise of the cross beam 6, at which time the screws which hold the bar or rail 23 in place will be slightly loosened. When the hanger is brought to its proper position the screws will be tightened up, and the crank and its attached shaft removed. This operation is effected with each of the shafts 18 and 19 to bring them to that position where they will cut off the requisite amount from the flaps of the blank which is being passed through the machine.

The cutter carried by the shaft 18 is of the disk type and denoted by 30. (See Fig. 4). It is designed to coöperate with a similar cutter 31 which is secured to a collar or hub 32, said collar encircling the shaft 12 and being held in its adjusted position thereon by a bolt 33 which passes into a nut 34 mounted in the longitudinal slot 13. The cutters act as rotating shear blades, and will of course sever anything which is passed between them.

The cross beam 6 also forms the support for the uppermost element of the secondary feed mechanism, which element may be said to comprise a roller 35 journaled in the lower end of a yoke-shaped member 36, the upper end of said member passing into a guide 37, which in turn has secured to it a cap-piece or plate 38 (see Fig. 8), which is engaged by the guide-rails 23 and 24. A spring 39 serves to press the yoke-shaped member 36 downwardly, and cause the roller 35 to bear yieldingly upon the upper face of the blank denoted by B. A pair of rollers 40 are secured to the shaft 12 below the roller 35 in the same manner as the hub or collar 32 is secured to said shaft. These rollers coöperate with the roller 35, and form the secondary feed mechanism for the blank.

The initial feed mechanism may be said to comprise a roller 41, which is mounted in the lower forward end of a frame 42 fulcrumed upon a bracket 43 secured to the forward face of the cross beam 6. An adjustable radius bar 44 determines the position of said roller 41 with reference to the lower co-acting roller 45, which roller extends upwardly through an opening formed in the bed to a point slightly above the upper face thereof. Said rollers 41 and 45 are positively driven, the roller 41 being mounted upon a shaft 46 which at its opposite end carries a gear 47 which meshes with a similar gear 48 secured upon the other end of the shaft 49 which forms the support for the roller 45. (See Figs. 3 and 8).

Shaft 49 has secured to it a band-pulley 50, and motion is imparted thereto through a belt 51 which passes about said pulley, and also about a second pulley 52 secured to the shaft 12. A second belt 53 overlies the belt 51 and passes therewith around the pulley 50, said outermost belt 53 passing however to the rear of the pulley 52 and about a pulley 54 secured to a shaft 55 mounted in bearings secured upon a rearward extension 56. A frame designated generally by 57, extends upwardly from the bearings of the shaft 55, and a roller 58 is journaled in the upper end of said frame. Endless belts 59 and 60 extend about said roller 58 and pulleys or wheels 61 mounted upon the shaft 55. These belts form a conveyer to remove the stock from the machine after it passes the cutters. (See Figs. 1 and 8).

The blanks are adapted to be fed onto the table by hand and in between a pair of guides which rest upon the table, and are adjustable laterally thereof toward and from each other to accommodate blanks of different sizes. Said guides also carry the switch mechanisms which divert the alternate flaps away from the cutter. The guides may be said to comprise two oppositely-disposed L-shaped angle bars 62 and 63, and are held in position with reference to the upper face of the table by a pair of shafts 64 and 65. (See more particularly Fig. 1). These shafts are held against longitudinal movement in their bearings, and a stem 66 (see Fig. 15) extends downwardly from each of the guide-bars in line with the shaft, the shafts being threaded and passing through the heads 67 of said member or stem 66. The opposite ends of the shafts 64 and 65 are reversely threaded, as seen in Fig. 1, so that upon the rotation of said shafts the guides 62 and 63 will be drawn together or separated from each other an equal distance from the center line of the machine. In order to effect a uniform rotation of the two shafts they are interconnected by a sprocket-chain 68, and a crank 69 is secured to one of the shafts, as 65, whereby the rotary motion may be imparted when desired.

Each of the guide rails 62 and 63 carries a switch mechanism adapted to divert the alternate flaps upwardly, so that they may be carried out of line and away from the cutters. The switch mechanism is the same upon each guide, and but one will be specifically referred to, the same reference letters being used upon both. This switch mechanism is best illustrated in Figs. 9 to 14, both inclusive.

Secured to the inner face of the vertically disposed guide rail 62 (and 63) are two guide members 70 and 71, the upper one 70 being provided with an upwardly extending guide finger 72 so positioned as to engage and carry downwardly into the space between the guides any flap of the blank which might be turned upwardly. The forward end of the lower guide is rounded as at 73. The guides 70 and 71 are held to the rail by screws 74 and 75 respectively, arranged adjacent their forward ends, and at their opposite ends each is provided with a laterally projecting pin 76 which extends into a slot or elongated opening formed in the rail. To bring the guides closer together or to narrow the space between them, an adjusting screw 77 passes through a lug 78 formed on the upper guide 70, and into a lug 79 extending from the lower guide, said lugs passing freely through openings formed in the guide rail, as best shown in Fig. 14. By turning the screw the space may be narrowed if need be to accommodate thin stock, as the stock should have no play as it passes through the guides at this point.

The adjacent faces of the guides 70 and 71 are cut away at their discharge end, and a switch is located in the space thus formed. Said switch, denoted by 80, is provided with a laterally projecting stud 81 (Fig. 12) between its ends, said stud forming the pivot for the switch and finding its bearing in a hub or sleeve 82 formed upon the guide rail. An arm 83 is secured to the outer end of the stud 81, and a weight 84 is adjustably secured thereto. Said counterweighted arm serves normally, with the parts arranged as shown, to throw the forward pointed end of the switch downwardly or into the position shown in Fig. 9, so that the oncoming blank flap will ride over the point and be carried or deflected upwardly. The next flap must, however, be carried downwardly, and the switch point must accordingly be raised. This is effected automatically by the stock, or more specifically, by the onward moving and elevated flap.

As will be seen upon reference to Figs. 9 and 10, the switch broadens out toward its rear end, and is provided with a roller 85 (Figs. 9, 10, 12 and 13), journaled on a stud 86, the roller occupying a position in rear of the main body of the switch which is cut away to receive it. The innermost faces of the guides 70 and 71 are likewise cut away adjacent the roller so that the switch and roller may have the necessary amplitude of movement. As will be seen upon reference to Fig. 9, the oncoming flap rides the switch, and as it comes into contact with the roller 85 it will depress the same and elevate the switch point. When the rear margin of the elevated flap clears the throat of the guide-way formed by 70 and 71, the switch will be elevated and stand above the next oncoming flap, which must not be elevated in order that it may pass on directly to the cutter and have the desired amount cut off its end.

As will be seen upon reference to Fig. 10, the second flap will pass below the first flap, and as soon as said first flap passes clear of the roller 85, the switch point will be thrown down and ride the upper face of the second flap. Said second flap contacting with the roller assists the counterweight in holding the switch point in that position where it will pass beneath the next succeeding or third flap, which will consequently be elevated. It will of course be appreciated that the order of deflection of the flaps may be changed by merely carrying arm 83 to the rear, or rotating it through 180° with reference to the switch and securing it in such position.

To carry the deflected flaps upwardly away from and clear of the knives, guide rods 87 are provided, said rods at their rear ends being adjustably secured to posts 88 extending upwardly from the rear portions of rails 62 and 63, while the forward lower and laterally bent ends of the rods extend in between supplemental guide-plates 89 and 90 bolted to the rails 62, 63. (See Figs. 1 and 2.) Suitable guard rails or bars 91 will preferably be provided, said rails extending from the hangers 22, and overhanging the shafts 12, 18 and 19 and the gears carried thereby, as shown in Fig. 1.

It is thought that the operation of the machine will be clearly understood from the foregoing description without the necessity of giving a detailed résumé thereof. Suffice it to say that the machine is capable of handling various grades of stock, and may be adjusted to handle different sized blanks and to accurately cut off the ends of each alternate flap end, in opposite pairs, so that when the blank is set up two of the flap ends will squarely abut at each end of the box.

Having described my invention, what I claim is:

1. In a machine of the character specified, the combination of cutting mechanism; and means for deflecting alternate sections of a continuous piece of stock to be cut from the cutter.

2. In a machine of the character specified, the combination of a cutter; and means operated by the stock as it passes through the machine for carrying alternate sections of the stock out of operative relation with the cutter.

3. In a machine of the character specified, the combination of a cutter; and an automatic switch adapted to deflect alternate sections of the stock being operated upon, out of line with the cutter.

4. In a machine of the character specified, the combination of a cutter; and a gravitating switch adapted to coöperate with the stock and to be moved tnereby to effect the elevation of alternate sections of the stock out of line with the cutter.

5. In a machine of the character specified, the combination of a cutter; a switch pivotally supported between its ends and arranged in line with the path of movement of the stock; means for normally holding the point of the switch in one position; and means coöperating with the opposite end of the switch to cause a rocking of the switch upon its pivot when the stock passes such end, whereby the switch point will be deflected and cause the next succeeding portion of the blank to move over the other side of the switch.

6. In a machine of the character specified, the combination of a pair of oppositely-disposed cutting mechanisms; a guide arranged in line with each cutting mechanism; and a switch coöperating with each of the guides to carry each alternate flap on each side of the blank being cut away from the cutting mechanism.

7. In a machine of the character specified, the combination of means for feeding the blank to be cut; a guide-way for the flap ends of the blank; cutting mechanism; and a deflector adapted to carry alternate flaps away from the cutter.

8. In a machine of the character specified, the combination of cutting mechanism; a guide for the flap ends of the stock to be cut; a pivoted switch mounted in the guide-way; and means for normally depressing the forward end of the switch to carry its point below the normal plane of movement of the stock.

9. In a machine of the character specified, the combination of cutting mechanism, a guide for the flap ends of the stock to be cut; a pivoted switch mounted in the guide-way; a roller mounted on the rear end of the switch; and means for normally depressing the forward end of the switch to carry it below the normal plane of movement of the stock.

10. In a machine of the character specified, the combination of cutting mechanism; a guide for the flap ends of the stock to be cut; a pivoted, gravitating switch mounted in the guide-way; and a deflector located to the rear of the switch and in front of the cutting mechanism, to turn those flaps up away from the cutting mechanism which are initially raised by the switch.

11. In a machine of the character specified, the combination of a guide rail; a pair of guide-bars secured thereto; means for adjusting said bars toward or from each other; a gravitating switch pivotally mounted on the guide rail between the rear ends of the bars; a deflector for the material raised by the switch; and a cutting mechanism located in rear of the switch.

12. In a machine of the character specified, the combination of a table; a pair of guide rails extending longitudinally thereof; means for securing said rails in their adjusted position toward or from each other; a pair of oppositely-disposed cutters; means for feeding the blank to be cut over the table and to the cutters; and means for deflecting alternate sections of the blank out of the path of the cutters.

13. In a machine of the character specified, the combination of a table; a pair of guide rails mounted thereon; means for moving said rails toward or from each other to adjust the machine for different widths of stock; a switch mechanism carried by each rail and adapted by the movement of the stock to raise each alternate flap; means for feeding the blanks; cutting mechanism; and means for deflecting the upturned flaps away from the cutting mechanism.

14. In a machine of the character specified, the combination of a table; a pair of guide rails mounted thereon; means for adjusting said rails simultaneously toward or from each other; a switch mechanism carried by each rail and adapted to elevate the alternate flaps of the blank upwardly; feed mechanism for feeding the stock forward over the table and through the switch mechanism; cutters arranged in line with the flaps of the blank; means for carrying the upturned flaps away from the cutter; and a supplemental feed mechanism operating upon the body of the blank adjacent the cutters.

15. In a machine of the character specified, the combination of a table; guide rails mounted thereon; means for moving said rails toward or from each other to secure a proper adjustment thereof; a switch mechanism carried by each rail and adapted to elevate alternate flaps of the blank; feed mechanism for the blank operating thereon adjacent the switch; a cross beam; a pair of hangers mounted on said beam and adjustable toward or from each other; a shaft mounted in each hanger; a cutter carried by the inner end of each shaft; a second shaft underlying the shafts aforesaid; gearing intermediate said shafts; cutters carried by the lower shafts and adapted to coöperate with the cutters upon the upper shafts; means for deflecting the upturned flaps away from said cutters; and a supplemental feed mechanism operative upon the blank adjacent the cutter.

In testimony whereof I have signed my name to this specification.

JOHN A. MOORE.